United States Patent [19]

Takagi

[11] Patent Number: 4,786,458

[45] Date of Patent: Nov. 22, 1988

[54] METHOD FOR FORMING A HOLLOW CONTAINER HAVING SUPPORTS

[76] Inventor: Toshio Takagi, 3-5, 1-chome, Shiragane, Korkurakita-ku, Kitakyushu-shi, Fukuoka-ken 802, Japan

[21] Appl. No.: 898,448

[22] Filed: Aug. 19, 1986

[51] Int. Cl.$^4$ .................. B29C 47/00; B29C 47/30
[52] U.S. Cl. ................................. 264/515; 264/541
[58] Field of Search ............... 264/515, 540, 541; 220/72.1; 425/525, 532

[56] References Cited

U.S. PATENT DOCUMENTS

| | | | |
|---|---|---|---|
| 3,080,614 | 3/1963 | Adams | 264/541 |
| 3,084,395 | 4/1963 | Thielfoldt | 264/541 |
| 3,103,036 | 9/1963 | Nave et al. | 264/515 |
| 3,371,376 | 3/1968 | Fischer et al. | 264/531 |

Primary Examiner—Jan H. Silbaugh
Assistant Examiner—Neil M. McCarthy
Attorney, Agent, or Firm—Jordan and Hamburg

[57] ABSTRACT

A heat-softening plastic material is extruded such that the plastic material forms a pine-shaped outer member and at least one rod-shaped core member is positioned in the inside space of the pipe-shaped outer member. Divided forming molds are disposed about the extruded plastic material except for an entrance opening for introducing gas such that only the pipe-shaped outer member is expanded by the pressurized gas and the thus formed container is subsequently cooled and hardened. The thus formed hollow container has at least one rod-shaped support extending between the upper and lower ends on the inside of the hollow container. The container will not expand and remains stable even if a high pressure fluid is introduced into the inside of the container.

1 Claim, 2 Drawing Sheets

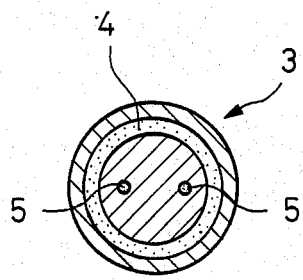
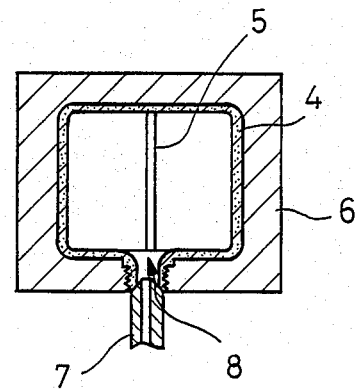
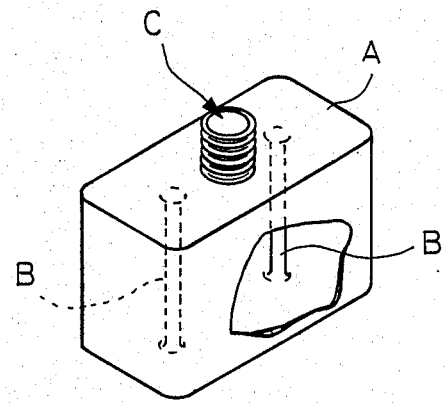

METHOD FOR FORMING A HOLLOW CONTAINER HAVING SUPPORTS

BRIEF SUMMARY OF THE INVENTION

The present invention relates to a method for forming a plastic hollow container which receives a fluid such as a liquid or powder particles, and more particularly to a plastic hollow container which is subjected to a high internal pressure. Such a plastic container is usually used for receiving liquid fuel. If the inside of the container is completely hollow, the bottom part of the container projects outwardly and is unstable because of the large internal pressure.

If a high strength matrrial such as reinforced plastic is used for the purpose of increasing the strength of the container itself, the cost of the materials is expensive. If the whole of the container itself is made with a thicker cross section, the weight of the container is increased and the additional material increases the cost.

For the purpose of avoiding increased cross sectional thickness while using the usual materials, it is considered that supporting members can be arranged in the inner hollow part of a hollow container. However, such containers have not been realized because of having to form such supports in a plastic hollow container.

In view of the foregoing, it is an object of the present invention to provide a method for easily forming a hollow container which is not deformed when subjected to a high internal pressure. Another object of the present invention is to provide a method for forming a hollow container having internal supports. These objects of the present invention are achieved by the following method:

(a) extruding a heat-softening plastic material downwardly from a die in which the plastic material forms a pipe-shaped outer member and one or more rod-shaped core members which are positioned internally of the outer member, (b) moving divided forming molds having a cavity and a hole for blowing gas about the outer member from a position spaced from the outer sides of the outer member, (c) air-tightly closing the top and bottom end parts except an entrance opening for blowing gas into the outer member by moving the divided forming molds to the outer member, (d) introducing pressurized gas into the outer member through the entrance opening, (e) expanding the outer member until the outer member engages the inside walls of the molds, and (f) cooling and hardening the expanded outer member.

BRIEF DESCRIPTION OF THE DRAWINGS

FIG. 2 is a cross-sectional view taken along line II—II in FIG. 1;

FIG. 3 is a cross-sectional view showing a pipe-shaped outer member which has been expanded by gas pressure; and FIG. 4 is a perspective view partly broken away of a hollow container made according to the present invention.

DESCRIPTION OF THE PREFERRED EMBODIMENTS

Figure 1:
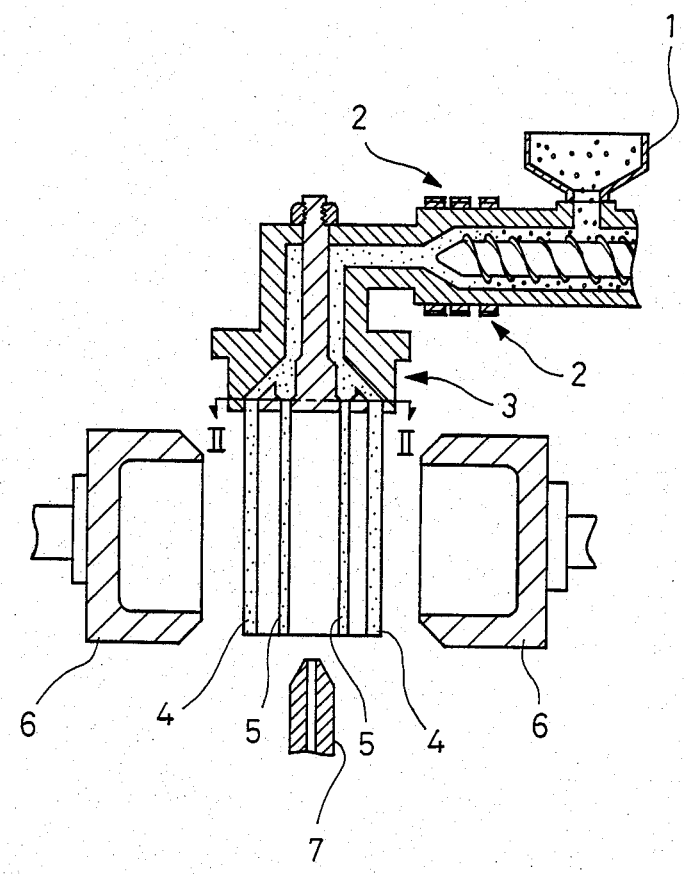
FIG. 1 is a schematic cross sectional view of one embodiment of the present invention.

A schematic illustration of an apparatus utilizing the method of the present invention is shown in FIG. 1. In FIG. 1, thermal plastic raw material stored in a hopper 1 is heated by a band heater 2 as the plastic material is pressed and transferred. The flowable thermal plastic raw material is extruded through a die 3. The die has an annular outer hole and inner holes positioned on the inside of the outer hole as shown in FIGS. 1 and 2. The outer hole is a closed ring and may be oval-shaped or of a polygonal shape. The plastic material which is softened by the die 3 is extruded downwardly, and the plastic material forms a pipe-shaped outer member 4 and rod-shaped core members 5. Divided forming molds 6, 6 are disposed about the extruded plastic material at the sides of the above-mentioned outer member 4, and the outer member 4 and core members 5 are both disposed in molds 6, 6. The pipe-shaped outer member 4 and rod-shaped core members 5 are cut to the desired length by the closing molds 6, 6, and the opened parts in the top and bottom of outer members 4 are closed except for a hole 8 for blowing gas by means of an insertion nozzle 7.

The nozzle 7 is inserted into the hole 8, and then gas under pressure is introduced through the hole 8. No changes occur to the rod-shaped members 5, but since gas under pressure is introduced into the inner hollow part of the member 4, the outer member 4 is expanded and is enlarged until the outer member 4 engages the inner wall of the molds 6, 6. Subsequently the outer member 4 is cooled and hardened. A hollow container which is formed by cooling and hardening is shown in FIG. 4. The softened part of the pipe-shaped member 4 has been expanded and forms a container A which consists of a hollow container, and the rod-shaped core members 5 which are not expanded, form supports B which are arranged to extend from the top and bottom of the container A. The part of the hole 8 for introducing the gas under pressure forms an opening for the container itself for introducing substances into the container. A thread is usually formed on the outer circumference of the hole 8. Such threads are formed by corresponding threads on the inside wall of the molds 6, 6.

As described above, a method is disclosed in which an annular outer hole and one or more inner holes are provided on a die of an extruding apparatus which extrudes heat-softening plastic material. A blow forming arrangement which is a usual method for forming a hollow container is also used in the present invention, and extruding of the softened plastic material, closing of the molds and utilizing pressurized gas are only required in this method. Therefore, there is no necessity for development of molds and other forming apparatus. A hollow container obtained according to the present invention has rod-shaped supports in which the top and bottom ends are formed as one part with the upper and lower ends of the container which comprise an outer shell. Therefore, there does not occur a situation where the hollow container projects outwardly and becomes unstable when a large internal pressure is applied to the inside of the hollow container.

What is claimed is:

1. A method of forming a hollow plastic container having a plurality of solid rod supports and an access opening, comprising extruding a plastic material through an extrusion die having an annular extrusion orifice encircling a plurality of circular extrusion orifices to form a tubular hollow outer member through said annular extrusion orifice and a plurality of solid rod supports through said circular extrusion orifices, said supports being disposed within said hollow outer member and being generally parallel to each other and to said hollow outer member; closing divided mold halves about said outer member thereby forming first and second end walls for said hollow outer member and solid rod supports internally of said hollow outer member, which supports have ends connected to said end walls of said outer member; forming said access opening during said closing step, said access opening being formed in said first end wall formed by the first extruded end of said hollow outer member; said step of forming said access opening comprising forming a protrusion which extends outwardly of said first end wall and has a through passage which defines said access opening; forming said second end wall as a closed wall to define a bottom wall of said container; introduciung a pressurized fluid into said hollow outer member through said access opening, utilizing said pressurized fluid to effect expansion of said hollow outer member so that said hollow outer member is contacted with interior walls defining a mold cavity formed by closing said mold halves, opening said mold halves and removing said container having a plurality of integrally formed internal solid rod supports and an access opening.

* * * * *